Sept. 5, 1933.  D. K. POPE  1,925,337

SPRING LUBRICATING DEVICE

Original Filed July 7, 1928

Inventor
Daniel K. Pope
By Frank S. Greene
Attorney

Patented Sept. 5, 1933

1,925,337

UNITED STATES PATENT OFFICE 1,925,337

SPRING LUBRICATING DEVICE

Daniel K. Pope, Cleveland, Ohio

Substitute for application Serial No. 291,027, July 7, 1928. This application October 3, 1929. Serial No. 397,108

3 Claims. (Cl. 267—37)

This invention relates to lubricators for springs having superposed overlapping leaves such as are used for supporting the bodies of motor vehicles and more particularly to lubricators of the type in which a pad of absorbent material serves as a reservoir for lubricant and is secured in contact with the spring to supply lubricant to the spaces between the leaves thereof.

The present invention has for an object to provide a spring lubricator of the type above referred to which will operate for long periods of time without supplying additional lubricant to the pad.

A further object of the invention is to provide a lubricant pad which is permanently impregnated with a lubricant and is at all times impervious to moisture.

A further object is to provide a spring lubricating device which positively excludes moisture from the spring.

A further object is to provide a spring lubricating device which supplies lubricant to the tips only of the overlapping leaves of the spring to decrease the resistance to the initial flexing movement, but which does not reduce the interleaf friction to an extent sufficient to weaken the spring or impair the shock absorbing action thereof.

A further object is to provide a lubricating pad which is impregnated with a lubricating composition which is of jelly-like consistency sufficiently fluent under pressure to effectively lubricate the face portions of the spring leaves contacting with the pad, but substantially unaffected by capillary attraction so that the pad remains uniformly impregnated as long as it is in service and will not act as a wick to draw moisture to the interior of the spring cover.

A further object is to provide a lubricating pad impregnated with a solid jelly-like lubricating composition whose physical characteristics remain substantially the same from a temperature well below 0° F. to a temperature well above 100° F., in other words, a lubricant which is substantially unaffected by temperature changes within the range of atmospheric temperatures to which the pad may be subjected in service.

The invention also has for an object to provide a spring cover which is provided with a heat insulating lining to minimize the condensation of moisture within the cover and further to provide a lining which is permanently impregnated with a lubricating composition which is in the form of a solid of jelly-like consistency and unaffected by capillary attraction at any temperatures to which the lining may be subjected in service, so that absorption of moisture by the lining is prevented.

The present application is a substitute for my copending application Serial No. 291,027, filed July 7, 1928, and a continuation in part of my copending application Serial No. 309,590, filed October 1, 1928.

With the above and other objects in view, the invention may be said to comprise the spring lubricator as illustrated in the accompanying drawings hereinafter described and particularly set forth in the appended claims, together with such variations and modifications thereof as will be apparent to one skilled in the art to which the invention appertains.

Reference should be had to the accompanying drawing forming a part of this specification in which.

Figure 1:
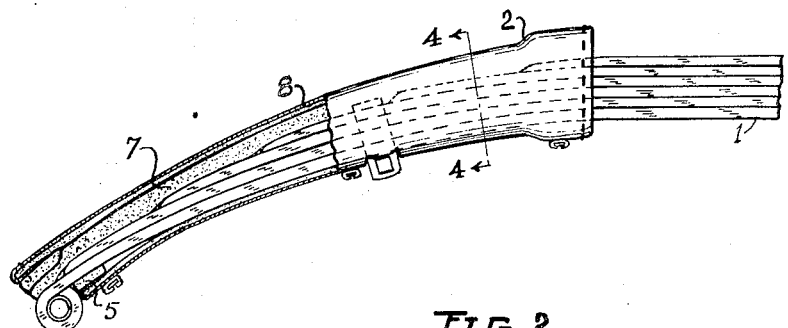
Figure 1 is a fragmentary side elevation showing a spring with the cover and lubricator attached thereto, a portion of the cover being broken away to show the lubricating pad.
Figure 2:
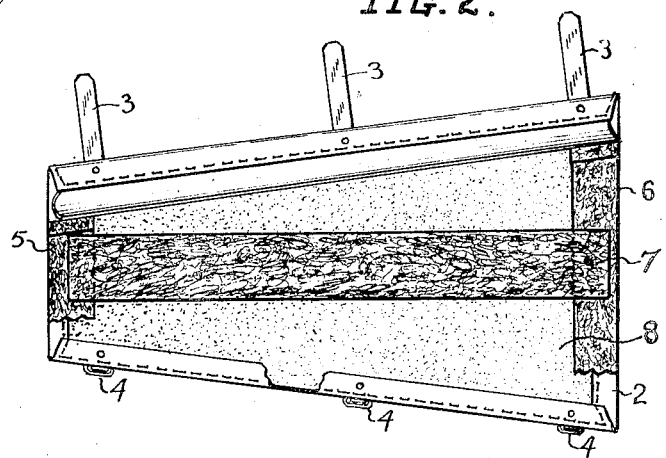
Fig. 2 is a plan view of the cover and lubricator detached from the spring.
Figure 3:
Fig. 3 is a perspective view of the lubricating pad.
Figure 4:
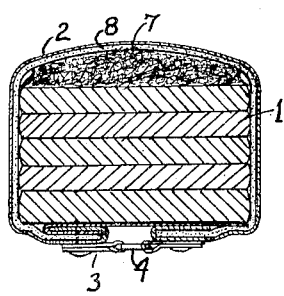
Fig. 4 is a section taken on the line indicated at 4—4 in Fig. 1.

As illustrated in the accompanying drawing, the device of the present invention is applied to a spring 1 which is composed of superposed leaves which overlap on one side of the spring with their ends at progressively greater distances from the end of the spring. A cover 2 of flexible waterproof material is formed to wrap about the spring with its opposite side edges adjoining along the under side of the spring, and in order to fasten the cover in place on the spring, the side edges of the cover are provided with tongues 3 and co-operating eyes 4, the tongues 3 being formed of bendable sheet metal and adapted to be inserted through the eyes 4, and bent back upon themselves to secure the cover snugly about the spring.

In order to provide a tight connection between the cover and springs at the ends of the cover, strips 5 and 6 of padding material such as felt are secured to opposite end edges of the cover and, when the cover is secured in place on the spring, the strips 5 and 6 are drawn tightly around the spring to prevent dust or water from entering the interior of the cover from the ends.

Extending longitudinally within the cover, there is an elongated pad 7 of absorbent material such as felt which extends the full length of the cover in contact with the overlapping leaves of the spring. This pad serves as a reservoir for lubricant and supplies lubricant to the spaces between the spring leaves.

The cover 2 is preferably provided with a felt lining 8 which serves as a heat insulator to prevent condensation of moisture on the surface of the spring within the cover.

It has heretofore been common practice to lubricate springs by means of a pad filled with oil or grease secured within a suitable spring cover. Such pads, by reason of the fluidity of the oil or grease contained therein gradually become dry so that it is necessary to renew the supply of oil or grease to maintain their effectiveness, means being commonly provided for introducing oil or grease into the cover. If the greasing or oiling of the pad is neglected, the pad, after it becomes dry, acts as a wick and will draw in water from the ends of the cover by capillary attraction and this water causes the material of the cover to rot and the springs to rust.

The entry of water into the spring cover of the present invention is prevented by impregnating the pad 7, strips 5 and 6, and lining 8 with a lubricating composition which is unaffected by capillary attraction and which, therefore, will not be drawn out of any portion of the pad, strips, or lining by capillary attraction. The impregnation of the felt or other absirbent material composing the lining, strips and pad is, therefore, permanent and these parts will positively exclude moisture as long as they are in service.

The lubricating composition should be of a consistency such that it will not be affected by capillary attraction and at the same time soft enough to flow when subjected to pressure to an extent such that lubricant will be applied to the portions of the leaves in contact with the pad in a quantity sufficient to effectively lubricate the spring.

I have found that certain lubricating compositions in the form of jelly-like solids which may be manufactured from mineral oils possess the qualities above referred to.

It is known that stable jelly-like solids may be produced by mixing a mineral oil which is liquid at ordinary atmospheric temperatures with relatively small quantities of certain stiffening agents such as certain salts of fatty acids such, for instance, as aluminum stearate, or stearanilid. The ingredients are mixed at a temperature slightly below the flash point of the oil and the mixture is then cooled at a relatively rapid rate. Certain compositions made as above described such as those made from mineral oil and aluminum soap or stearanilid are jelly-like solids at ordinary atmospheric temperatures, which are substantially free from water, which do not absorb water and which possess good lubricating qualities.

It is desirable, in order to provide effective lubrication both in hot and cold weather that the lubricating composition employed to impregnate the pad be such that its consistency is not materially affected by changes in temperature within the range of atmospheric temperatures in summer and winter.

As a general rule, the melting point of mineral oil, lubricating compositions such as above described may be raised by increasing the percentage of soap or other stiffening agent employed, and I preferably employ a composition having a melting point well above the highest atmospheric temperature to which the pad may be subjected in use.

In order to avoid stiffening of the lubricant when subjected to winter weather, I preferably employ a composition made from an asphaltum base, mineral oil of low cold test and relatively high viscosity. It has been found that jelly-like lubricating compositions made from low cold test asphaltum base oils may be subjected to temperatures considerably below freezing without any appreciable stiffening of the composition.

On account of its lubricating qualities, a small quantity of graphite is preferably incorporated in the pad 7 in such manner that the graphite particles are uniformly interspersed through the pad. To obtain a uniform distribution of the graphite, it is preferably uniformly incorporated in the lubricating composition before the composition is forced into the pad.

To uniformly mix the graphite into the lubricating composition when the composition is in its solid state would be very difficult, and the graphite cannot be mixed with the composition when it is in its liquid state for the reason that the graphite precipitates rapidly, due to its greater specific gravity. However, it has been found that if the graphite is mixed with the composition during the cooling thereof when the composition is in a semi-liquid state, the particles of graphite may be uniformly interspersed through the composition and will be so interspersed after the composition has fully solidified.

The graphite employed is preferably flake graphite, since it has been discovered that flake graphite in the composition has the effect of making the composition somewhat softer and more fluent under the action of pressure.

The impregnation of the felt or other padding material used for the strips 5 and 6, pad 7 and lining 8 is preferably effected by passing the material in sheet form between impregnating rollers which have peripheral radially movable vanes for retaining a quantity of the lubricating composition on the periphery of the roller and for trapping the lubricant against the surface of the sheet material passing between the rollers so that the jelly-like composition is forced under heavy pressure into the fabric.

After passing through the impregnating rollers, the sheet of material is passed between smooth pressure rollers to effect a more even distribution of the lubricating composition throughout the material. After the material has been impregnated, it is cut into strips to form the pads and end strips or into pieces of the size and shape required for the lining.

While mineral oil compositions are considered preferable, it is to be understood that other oils may be used in the composition since the stiffening agents above referred to effect the raising of the melting point and stiffening the consistency of oils and greases generally.

While, as above explained, the percentages of the constituents of the lubricating composition may be varied considerably, it has been found that the following composition gives excellent results:

| | Per cent |
|---|---|
| Asphaltum base zero oil | 80 to 85 |
| Aluminum stearate | 13 to 18 |
| Flake graphite | 2 |

Since the lubricant contained in the pad is a jelly-like solid not subject to capillary attraction only a very small quantity of the lubricant is caused to enter between the leaves of the spring and this lubricant does not penetrate between the contiguous faces of the leaves sufficiently to destroy or greatly lessen the interleaf friction. The lubricant does, however, effectively lubricate the tips of the leaves and lessens the frictional resistance to the initial flexing movements of the spring. The spring will, therefore, respond more quickly to the road shocks to which the vehicle is subjected and the interleaf friction will thereafter be effective to retard the movement of the spring. The weakening of the spring and the increase in its amplitude of movement due to the presence of lubricant between the leaves has always been a disadvantage inherent in spring lubricating methods heretofore employed, but the present invention provides a method of lubrication by which the responsiveness of the spring is increased without weakening the spring or sacrificing the advantageous retarding effect due to interleaf friction.

It will be apparent that the present invention provides a spring protecting and lubricating device which has long life, which does not require attention after it has been installed on the spring, which effectually excludes moisture, which minimizes condensation within the cover, and which supplies the lubricant in such manner as to greatly improve the action of the spring without objectionable lessening of the interleaf friction.

What I claim is:

1. A lubricator for springs having superposed overlapping leaves comprising a pad of absorbent material impregnated with a lubricating composition substantially free from water and composed of a mineral oil of high viscosity and low cold test and a stiffening agent, said composition being of substantially jelly-like consistency fluent under pressure but substantially unaffected by capillary attraction, the physical characteristics of said composition being substantially unaffected within the range of atmospheric temperatures to which the pad may be subjected in service, and means for retaining said pad on the spring in contact with the exposed faces of the overlapping leaves.

2. A lubricator for springs having superposed overlapping leaves comprising a pad of absorbent material impregnated with a lubricating composition in the form of a solid of jelly-like consistency fluent under pressure, but substantially unaffected by capillary attraction, the physical characteristics of which are substantially unaffected within the range of atmospheric temperatures to which the pad may be subjected in service and means for retaining the pad on the spring in contact with the exposed faces of the overlapping leaves, comprising a cover of water-proof material enclosing the spring pad.

3. A lubricator for springs having superposed leaves which overlap in stepped relation comprising a pad of absorbent material impregnated with a lubricating composition which is of a consistency such that it is fluent under pressure but which does not flow by gravity and which is substantially unaffected by capillary attraction, and means for securing said pad on the stepped face of the spring against the exposed faces of the overlapping leaves thereof, whereby the overlapping leaves are lubricated at the tips thereof by lubricant wiped off the pad onto said exposed faces by the rubbing of the exposed faces of the leaves against the surface of the pad during flexing of the spring.

DANIEL K. POPE.